(12) United States Patent
Isaacson et al.

(10) Patent No.: US 7,571,172 B2
(45) Date of Patent: Aug. 4, 2009

(54) METHODS, DATA STORES, DATA STRUCTURES, AND SYSTEMS FOR ELECTRONIC IDENTITY AGGREGATION

(75) Inventors: Scott Alan Isaacson, Woodland Hills, UT (US); Stephen R Carter, Spanish Fork, UT (US); Frank Allan Nutt, Austin, TX (US)

(73) Assignee: Novell, Inc., Provo, UT (US)

( * ) Notice: Subject to any disclaimer, the term of this patent is extended or adjusted under 35 U.S.C. 154(b) by 1081 days.

(21) Appl. No.: 10/430,542

(22) Filed: May 6, 2003

(65) Prior Publication Data

US 2004/0225669 A1    Nov. 11, 2004

(51) Int. Cl.
G06F 17/30 (2006.01)
(52) U.S. Cl. ............... 707/101; 707/1; 707/2; 707/100
(58) Field of Classification Search ......... 707/100–101, 707/1–4
See application file for complete search history.

(56) References Cited

U.S. PATENT DOCUMENTS

| | | | | |
|---|---|---|---|---|
| 5,860,004 A * | 1/1999 | Fowlow et al. | | 717/109 |
| 5,937,402 A * | 8/1999 | Pandit | | 707/4 |
| 6,061,743 A | 5/2000 | Thatcher et al. | | 709/302 |
| 6,167,445 A * | 12/2000 | Gai et al. | | 709/223 |
| 6,487,546 B1 | 11/2002 | Witkowski | | 707/1 |
| 6,546,420 B1 | 4/2003 | Lemler et al. | | 709/224 |
| 6,591,260 B1 * | 7/2003 | Schwarzhoff et al. | | 707/2 |
| 7,475,055 B2 * | 1/2009 | Hutchison et al. | | 707/2 |
| 2003/0131073 A1 * | 7/2003 | Lucovsky et al. | | 709/219 |
| 2003/0204553 A1 * | 10/2003 | Neylon | | 709/104 |
| 2004/0002939 A1 * | 1/2004 | Arora et al. | | 707/1 |
| 2004/0083222 A1 * | 4/2004 | Pecherer | | 707/100 |
| 2007/0073767 A1 * | 3/2007 | Springer et al. | | 707/103 R |

FOREIGN PATENT DOCUMENTS

EP    1118948 A2    7/2001

OTHER PUBLICATIONS

Garcia-Molina, H., "Database system implementation", *Pretice Hall*, (2000),595-601.
Lim, Ee-Peng, "Entity Identification in Database Intergration", *Proceedings of the International Conference on Data Engineering, IEEE Comp. Soc. Press*, US, vol. Conf. 9, (1993),294-301.
Parent, Christine, "Issues and Approaches of Database Inegration", *Communications of the Association for Computing Machinery, Communications of the Association for Computing Machinery*, New York, US, vol. 41, No. 5, (1998),166-178.

* cited by examiner

*Primary Examiner*—Hung T. Vy
*Assistant Examiner*—Hanh B Thai
(74) *Attorney, Agent, or Firm*—Schwegman, Lundberg & Woessner, P.A.

(57) ABSTRACT

Methods, data stores, data structures, and systems provide techniques for aggregating identities. A schema defines an aggregated identity. The aggregated identity includes one or more identifications and one or more attributes. The identifications are acquired from identity authorities defined in the schema. Furthermore, the attributes are acquired from identity sources defined in the schema. One or more of the identifications can comprise a unique identifier or key for the aggregated identity. The aggregated identity can be stored as a record in an identity aggregation data store for rapid access and consumption.

21 Claims, 4 Drawing Sheets

METHODS, DATA STORES, DATA STRUCTURES, AND SYSTEMS FOR ELECTRONIC IDENTITY AGGREGATION

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2003, Novell, Inc., All Rights Reserved.

FIELD OF THE INVENTION

The present invention relates to techniques for aggregating electronic identities.

BACKGROUND OF THE INVENTION

In today's business environment, enterprises continuously strive to automate and integrate their legacy information and systems. Automation may help an enterprise control its costs by reducing its resource needs and allowing it to operate in a more timely and efficient manner. Furthermore, by integrating legacy information and systems an enterprise can improve its decision making, since the information is coordinated and linked in ways not previously possible without substantial manual effort and expense.

Conventionally, attempts at integrating legacy information and systems involve accessing information from native and external data stores when it is needed and normalizing the accessed information to ready it for use. However, problems can arise when accessing information from an external data store if a non-native access method or an application-specific format needing translation is required to ready the information for use Techniques for integrating information are often referred to as "data federation" techniques. As described above, implementing such techniques can be problematic.

However, data federation is generally considered easier to implement than integrating the processing logic of legacy systems. This is so because it is generally easier to integrate the information output of legacy systems (i.e., data federation) than to integrate the processing logic of such systems (e.g., by modifying source code).

Accordingly, existing integration techniques are focused on data federation solutions. However, these techniques are typically proprietary and ad hoc in nature. As a result, today's enterprises often have a variety of integration solutions spread throughout their computing environments. Each of these solutions must be maintained, supported, and upgraded. Therefore, today's enterprise typically dedicates a significant amount of its Information Technology resources to implementing data federation solutions.

Thus, improved techniques for federating data are needed.

SUMMARY OF THE INVENTION

In various embodiments of the invention, techniques are presented for federating data aggregate identities to form a new aggregated identity that can be consumed more efficiently and used to bridge a plurality of similar identities residing in a plurality of locations.

More specifically, and in one embodiment of the invention, a method to aggregate an identity is presented. One or more identity authorities and one or more identity stores are accessed with a schema in order to acquire identifiers and attributes associated with the identity. Moreover, the acquired identifiers and attributes are assembled to aggregate the identity.

In another embodiment of the invention, an identity aggregation data store, residing in a computer accessible medium, is provided. The identity aggregation data store includes primary keys, secondary keys, and attributes. The primary keys are associated with first identifications acquired from at least one of one or more external sources. The secondary keys are associated with second identifications acquired from at least one of one or more external sources. Further, the attributes are associated with the primary and the secondary keys and acquired from the at least one of the one or more external sources. Additionally, the primary keys, the secondary keys, and the attributes are assembled in fields according to an aggregate schema that defines aggregate identity records in the identity aggregation data store.

In still another embodiment of the invention, an identity aggregation schema data structure used to aggregate an identity and residing in a computer accessible medium is described. The identity aggregation schema data structure includes primary key information, identification information, and attribute information. The primary key information defines a primary key for the identity, which is composed from at least one of one or more identity authorities. The identification information defines identifications for the identity, which is composed from at least one of one or more of the identity authorities. Furthermore, the attribute information defines attributes for the identity, which is composed from at least one of the one or more identity authorities and at least one of one or more identity sources.

In yet another embodiment of the invention, an identity aggregation system is provided. The identity aggregation system includes an aggregation schema, an identity store, an identity authority, and an identity aggregation store. The aggregation schema is for defining and formatting records of the identity aggregation store by defining access to the identity authority and to the identity store, which are needed to generate aggregate identities that are stored in the identity aggregation store.

Still other aspects of the invention will become apparent to those skilled in the art from the following description of various embodiments. As will be realized the invention is capable of other embodiments, all without departing from the invention. Accordingly, the drawings and descriptions are illustrative in nature and are not intended to be restrictive.

DETAILED DESCRIPTION OF THE INVENTION

Figure 1:
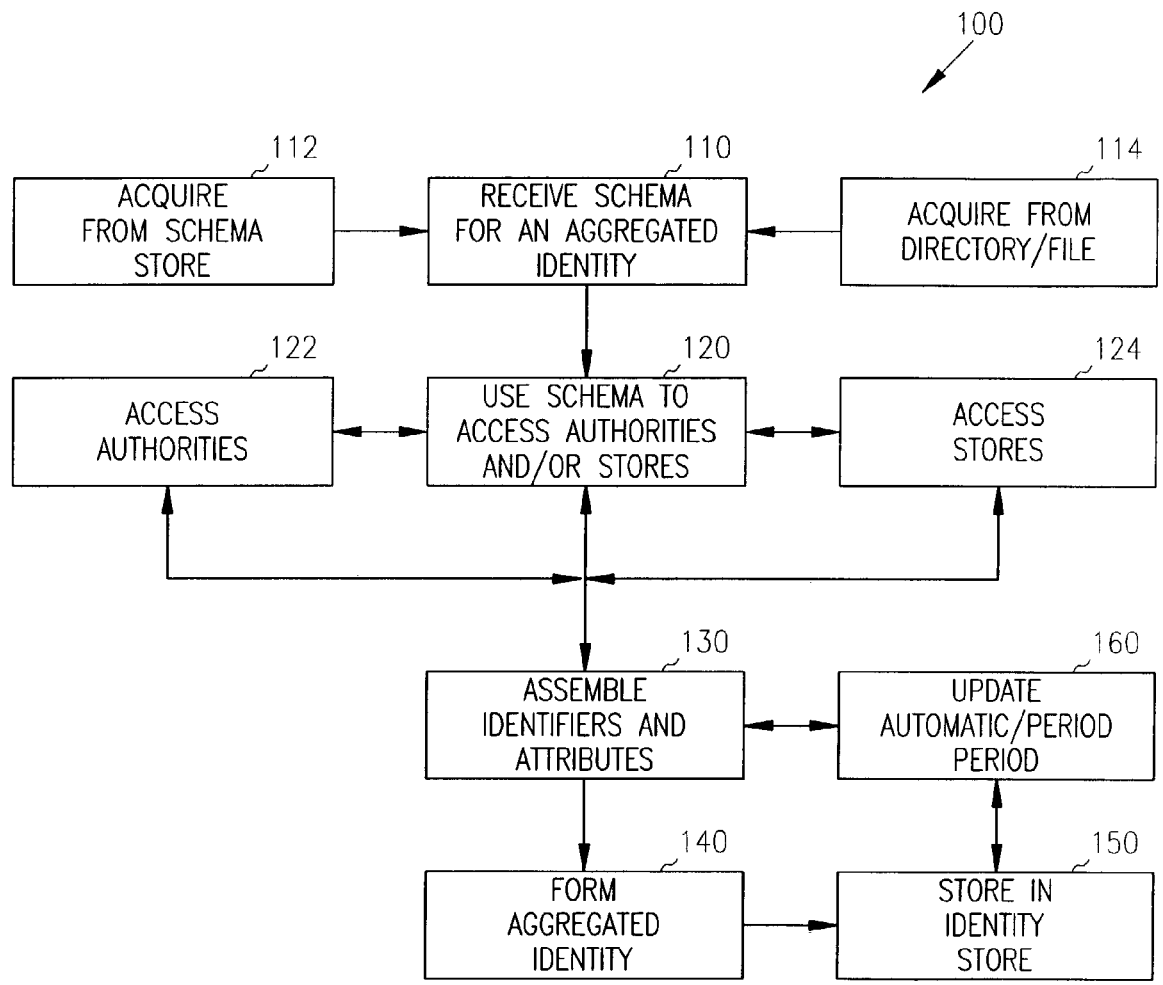
FIG. 1 is a flowchart representing a method to aggregate an identity, according to one embodiment of the invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the invention. The following description is, therefore, not to be taken in a limited sense, and the scope of the invention is defined exclusively by the appended claims.

In various embodiments of the invention, the term "identity" is used. An identity refers to an electronic identifier or attribute that is used to identify electronic data, such as applications, resources (e.g., physical and logical), entities, users, policies, directories, or any other objects represented in a computer readable medium. Identities can be unique in a given context, but do not need to be The term "schema" refers to a definition for a data model. The definition can be used to define an entire data store or used to define tables or other data structures within a data store. The data store can be relational (e.g., database), plex, hybrid, object oriented (e.g., directory) or positionally defined.

Additionally, for purposes of the invention an "authority" is an application, system, or interface that creates, manages, and distributes identities. An authority can include a data store, and may sometimes be referred to as an authoritative source.

A number of programming languages and conventions exist within the industry to create schemas. For example, the Extensible Markup Language (XML) Schema Definition (XSD) promulgated by the World Wide Web Consortium specifies how to describe elements in an XML document. The XSD can be used to verify that each item of content in a document adheres to the description of the element or attribute in which the content is to be placed. Of course, any consistent convention designed to be processed by any programming language can be used to develop a schema. All of such schemas and schema implementations are encompassed by this invention.

One embodiment of this invention is implemented using the DirXML product, distributed by Novell, Inc., of Provo, Utah. Moreover, various embodiments utilize the eDirectory and NetWare products also distributed by Novell, Inc. In addition, various embodiments of the invention use data formats, such as XML, Extensible Style Sheet Language (XSL), Standard Generalized Markup Language (SGML), Hypertext Markup Language (HTML), and the like. Additionally, various embodiments of the invention are particularly well suited for Secure Identity Management (SIM) solutions and products.

Of course, the invention can be implemented in a variety of applications, systems, schema conventions, programming languages, and data formats. Additionally, the invention is not limited to any particular network. Thus, any hardwired (direct or indirect), or wireless network can be used.

FIG. 1 is a flowchart representing one method 100 to aggregate an identity, according to one embodiment of the invention. The method 100 is implemented in an electronic environment on a network. The network can be, without limitation, a Local Area Network (LAN), a Wide Area Network (WAN), or a combination of LANs and WANs interfaced together. Furthermore, as mentioned above, the network can be hardwired or wireless. Thus, various aspects of the method 100 are implemented in various tools, systems, and applications within the network.

At 110, a schema is received for an aggregated identity. The schema can be received from a data store, at 112, or from a directory or electronic file at 114. The schema defines a data model for an aggregated identity. The identity can be associated with any electronic resource (e.g., physical or logical), policy, set of decisions or results from policy enforcements, application, use, and the like. In one embodiment, the schema is represented in an XSL data format conforming to XSD conventions.

The schema defines identifiers and attributes associated with an aggregated identity. Multiple identifiers can represent a single electronic resource or data structure. For example, one identifier associated with a Human Resource (HR) application can represent employees by Social Security Number (SSN). Yet, at the same time, another application can represent employees by badge numbers. Thus, it is readily apparent that there are many circumstances where multiple identifiers are used within an enterprise to identify the same thing. Moreover, the data stores associated with these systems often are disparate or not integrated in such a way that data federation can be readily achieved.

At 120, the schema is processed by an application such as a schema parser application. Such parsers are readily known and available to one of ordinary skill in this art. Of course, any existing, custom-developed, or other schema parser or schema processing application can be used to consume and process the schema. Identities are associated and acquired from identity authorities.

An identity authority is a system or application that controls, creates, and manages identities. Thus, in the example above, the HR application and the other application are examples of identity authorities, since each application at least creates, controls, or manages SSNs or badge numbers, respectively.

Additionally, attributes associated with an electronic resource or data structure can be acquired with use of the identifiers. Attributes include other data useful in consuming or processing information associated with an electronic resource or data structure. Attributes can include, for example, descriptive names, data formats, and quantitative values. Attributes can exist within identity authorities or independent from the identity authorities within identity stores.

Thus, at 120, a schema parsing application or processing application uses the schema to receive instructions defined in the schema that defines the identity authorities having identifications and identity stores having attributes, all of which are desirable to assemble an aggregate identity data structure. Accordingly, at 122, identity authorities are queried or accessed to acquire identifiers defined in the schema. Moreover, at 124, any needed identity sources are accessed with the appropriate identifiers to acquire attributes defined in the schema.

At 130, the acquired identifiers and attributes are assembled into an instance of an aggregated identity data structure. The schema can be used to produce one or more aggregated identities, each of which is an instance of aggregated identity data structure. Each instance will conform to the same definitions but have different values associated with different acquired identifiers and attributes. Thus, at 140, one or more aggregated identities are formed.

These instances of aggregated identities can, at 150, be stored as records in an aggregated identity store for ready access and consumption by one or more consuming applications. Accordingly, new aggregated data structures can be formed and stored for rapid and efficient access.

These new aggregated identities are particularly useful in normalizing, integrating, and enforcing policies within a network. For example, consider a first policy and a second policy, where each policy deals with procedures and activities associated with hiring an employee. The first policy may be associated with an HR department, and the second policy may be associated with a telecommunications department. Each policy includes an individual identifier and its own attributes.

Moreover, the identifiers and attributes can reside in separate systems and data stores. A single aggregated identity schema can be developed to create an entirely new identity for a global policy that is the aggregation of both the first and second policies. Entirely new operations, functions, reports, and management can be performed with this new global policy by using the aggregated identity. Additionally, policy conflicts that were before undetected can now be resolved to unify several disparate policies.

As another example, with respect to policy enforcements, consider decisions that a particular Policy Enforcement Point (PEP) can make or is instructed to make. Conventionally, the available decision is provided to the PEP for execution, without any alternative decisions if a particular decision is not enforceable by the PEP due to some other circumstance within the network. With teachings of the this invention, a set of available decisions can be provided as a single aggregated identity to the PEP, with individual and alternate decisions being ordered within a set of decisions identified by the aggregated identity. Thus, PEPs can now select and process alternate decisions or process a set of decisions in an ordered way using the aggregate identity that represents a set of canonical decisions.

In some embodiments, at 160, the aggregated identity store can be automatically updated with data values for instances of aggregated identities. Automatic updates can occur with triggers in the identity authorities and the identity stores. In other embodiments, monitoring applications can raise events when changes in data values that affect an instance of an aggregated identity are detected in the identity authorities and the identity stores.

In other embodiments, at 160, the aggregated identity store can update values for instances of the aggregated identities at periodic times or intervals. These times or intervals can be configured based on the needs and desires of an administrator for purposes of resource efficiency.

One of ordinary skill in this art now appreciates how the teachings of the this invention can be used to create schemas that can be processed to generate new aggregate identities for new data structures. Moreover, multiple instances of schemas can permit multiple views or instances of aggregate identities. These new instances of data structures can be consumed by and processed by additional applications. Thus, it is now apparent how data can be more efficiently federated and normalized for purposes of leveraging and integrating an enterprise's knowledge. This is achieved without the proliferation of ad hoc programming required by conventional approaches.

Figure 2:
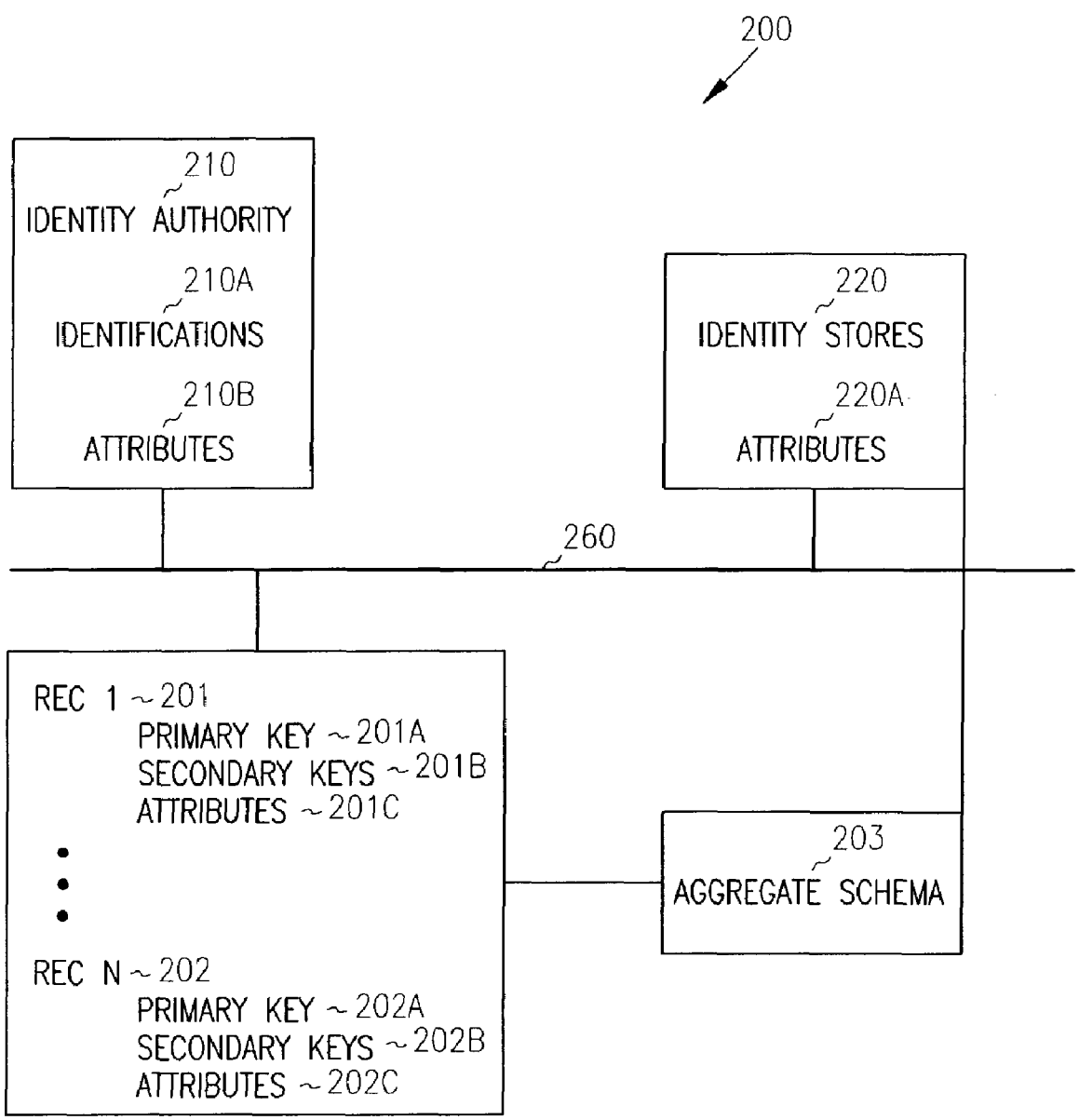
FIG. 2 is a diagram of an identity aggregation data store, according to one embodiment of the invention.

FIG. 2 is a diagram of an identity aggregation data store 200, according to one embodiment of the invention. The data store 200 can be a relational data store or an object-oriented data store. Furthermore, the data store 200 is accessible via a network 260. The data store 200 includes a plurality of records 201-202. Each record 201-202 includes a primary key 201A and 202A, one or more secondary keys 201B and 202B, and one or more attributes 201C and 202C.

An identity authority 210 provides identifications 210A, some of which are used to construct the primary keys 201A and 202A. The primary key 201A or 202A is a unique identification used to access the appropriate instance of an aggregated identity, which is embodied in one of the records 201 or 202 in the identity aggregation data store 200. In some embodiments, the primary key 201A or 202A is derived from a single identification 210A. In other embodiments, the primary key 201A or 202A is constructed as a plurality of identifications 210A.

The identity authority 210 can also include one or more attributes 210B that are also populated in records 201 and 202 as attributes 201C and 202C, respectively. Attributes 201C and 202C can also be acquired from identity stores 220 having attributes 220A. Access to specific attributes 220A within the identity stores 220 can be acquired using identifications 210A acquired from the identity authority 210.

The identity authority 210 and the identity stores 220 are external sources of information that include editorial master versions of the identifications 210A and attributes 210B and 220A. However, in some embodiments, a number of attributes 201C or 202C within the identity aggregation data store 200 can be unique to the identity aggregation data store 200 as a result of being produced by unique operations performed on records 201 and 202. The identity store 220 shares a primary or secondary key with the identity authority 210, so that attributes in the identity store 220 can be associated with a target principal in the identity aggregation data store 200 (not shown in FIG. 2).

Furthermore, secondary keys 201B and 202B represent identifications 210A included within the identity authority 210. The exact mapping between identifications 210A and primary keys 201A and 202A is defined within the aggregate schema 203. Moreover, the selection of attributes 210B and 220A, which are depicted in attributes 201C and 202C, are defined by the aggregate schema 203.

The schema 203 is processed by a schema processing application or a schema parser. The schema processing application or schema parser can be generic and need not be specific to any instances of aggregated identity depicted as records 201 or 202. In other words, the schema processing application or schema parser can be acquired from existing applications available in the industry or custom developed.

The identity authority 210 controls and distributes the identifications 210A. The identity authority is the source for identifications 210A. A primary key 201A or 202A can be mapped to a single identification 210A or to a plurality of identifications 210A. In some embodiments, the primary key 201A or 202A is generated automatically by the identity store 200 and is independent of any particular identification 210A.

In one embodiment, the schema 203 can be automatically processed or activated to populate the aggregated identity records 201 and 202 when changes are detected in identifications 210A, attributes 210B, or attributes 220A. In other embodiments, the schema 203 can be periodically activated to populate the aggregated identity records 201 and 202 at configured periods or intervals.

Additionally, in some embodiments, the aggregated identity data store 200 can reside entirely in volatile storage (e.g., such as a cache) and created when needed using the schema 203. In other embodiments, the aggregated identity data store 200 can reside partially in volatile storage and partially in non-volatile storage. Furthermore, the aggregated identity data store 200 can be embodied in a data warehouse, database, directory, electronic file, and the like.

Also, in some instances, the attributes 201C and 202C can include links back to the source (e.g., 210 or 220) from which the attributes 201C or 202C were originally acquired. These links can be used for rapid subsequent access and used to keep attributes up-to-date within the aggregated identity data store 200. Therefore, access to the aggregated data structure 220 can provide a real time link to the attributes 201C and 202C in their native sources (e.g., 210 or 220). Thus, by using links updates and synchronization are more easily achieved. Of course, updates to links can still be performed on a periodic or automatic basis in order to ensure links are not stale or that other links have not been added.

One now appreciates how an aggregated identity data store 200 can be created and populated using an aggregate schema 203, where identifications 210A from identity authorities 210 and attributes 210B or 220A are assembled as aggregate identities. Instances of these aggregate identities are represented as records 201 and 202 within the aggregated identity data store 200, and can be consumed or processed by other applications as new data structures.

Figure 3:
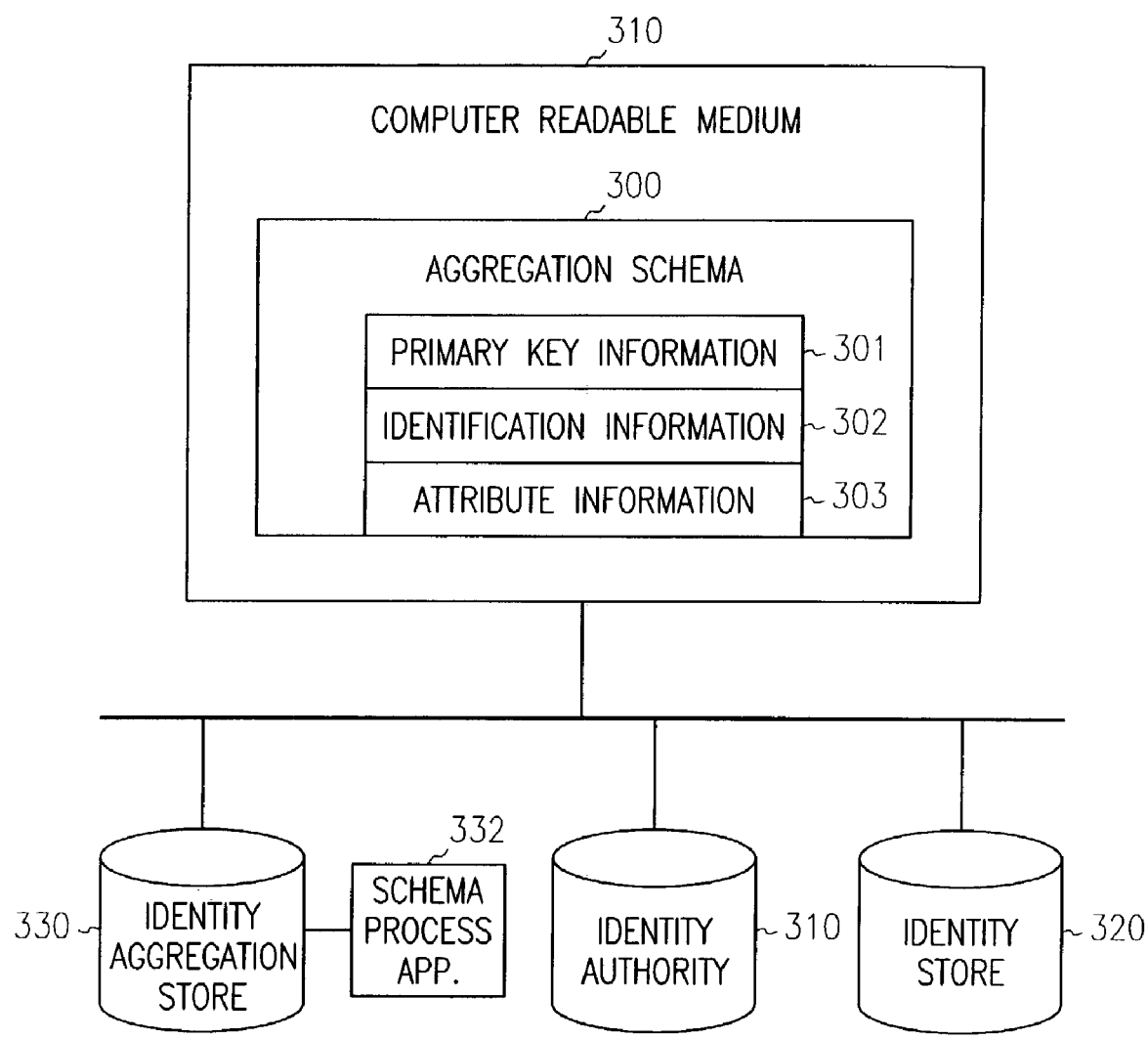
FIG. 3 is a diagram of an identity aggregation schema data structure, according to one embodiment of the invention.

FIG. 3 is a diagram of an identity aggregation schema data structure 300, according to one embodiment of the invention. The aggregation schema data structure 300 resides in or is accessible to a computer readable medium 310. The data format of the structure 300 can be any data format (e.g., XML, HTML, and SGML) and the structure or syntax can be represented in any language (e.g., XSL and others) or convention (e.g., XSD).

The aggregation schema data structure 300 includes primary key information 301, identification information 302, and attribute information 303. The aggregation schema data structure 300 is used to define an aggregated identity. This aggregated identity is acquired or formatted by processing the aggregation schema data structure 300 using a schema processing application or parser application 332. During processing, logic in the schema processing application 332 is driven by definitions in the aggregation schema data structure 300, which causes an identity authority 310, an identity store 320, and an identity aggregation store 330 to be accessed for information.

The primary key information 301 is defined within the aggregation schema data structure 300 and can be automatically and uniquely generated or generated from one or more identifications acquired from the identity authority 310. The primary key information 301 once populated with data creates a unique identifier for an aggregated identity data structure and can be used to access and modify a specific instance of an aggregated identity data structure.

The identification information 302 is also defined within the aggregation schema data structure 300 and is automatically acquired from the identity authority. The identification information 302 can be used as secondary keys or for processing an instance of a populated aggregated identity data structure.

The attribute information 303 defines attributes for the aggregated identity, which are composed from the identity authority 310 or identity store 320. Attribute information 303 can be normalized into a generic processing format from different disparate formats that may exist in the identity authority 310 or identity store 320.

The schema processing application 332 consumes or uses the aggregation schema data structure 300 as input in order to drive processing logic that creates instances of aggregated identities that are populated in the identity aggregation store 330 as records. Each record in the identity aggregation store 330 represents an instance of an aggregated identity that was populated by processing the aggregation schema data structure 300 and accessing the identity authority 310 or the identity store 320. The schema processing application 332 can be written in any programming language. In one embodiment, the schema processing application is written as an XSL Transformation (XSLT) application.

In some embodiments, the records of the identity aggregation store 330 are automatically or periodically updated by the schema processing application 332 processing the identity aggregation schema data structure 300. This can be achieved by raising an event to the schema processing application 332 when a data value associated with one of the identifications or one of the attributes defined in the identity aggregation store is modified or changed. This event causes the schema processing application 332 to process the aggregation schema data structure 300 in order to perform an update to one or more of the aggregated identities represented as records in the identity aggregation store 330.

Figure 4:
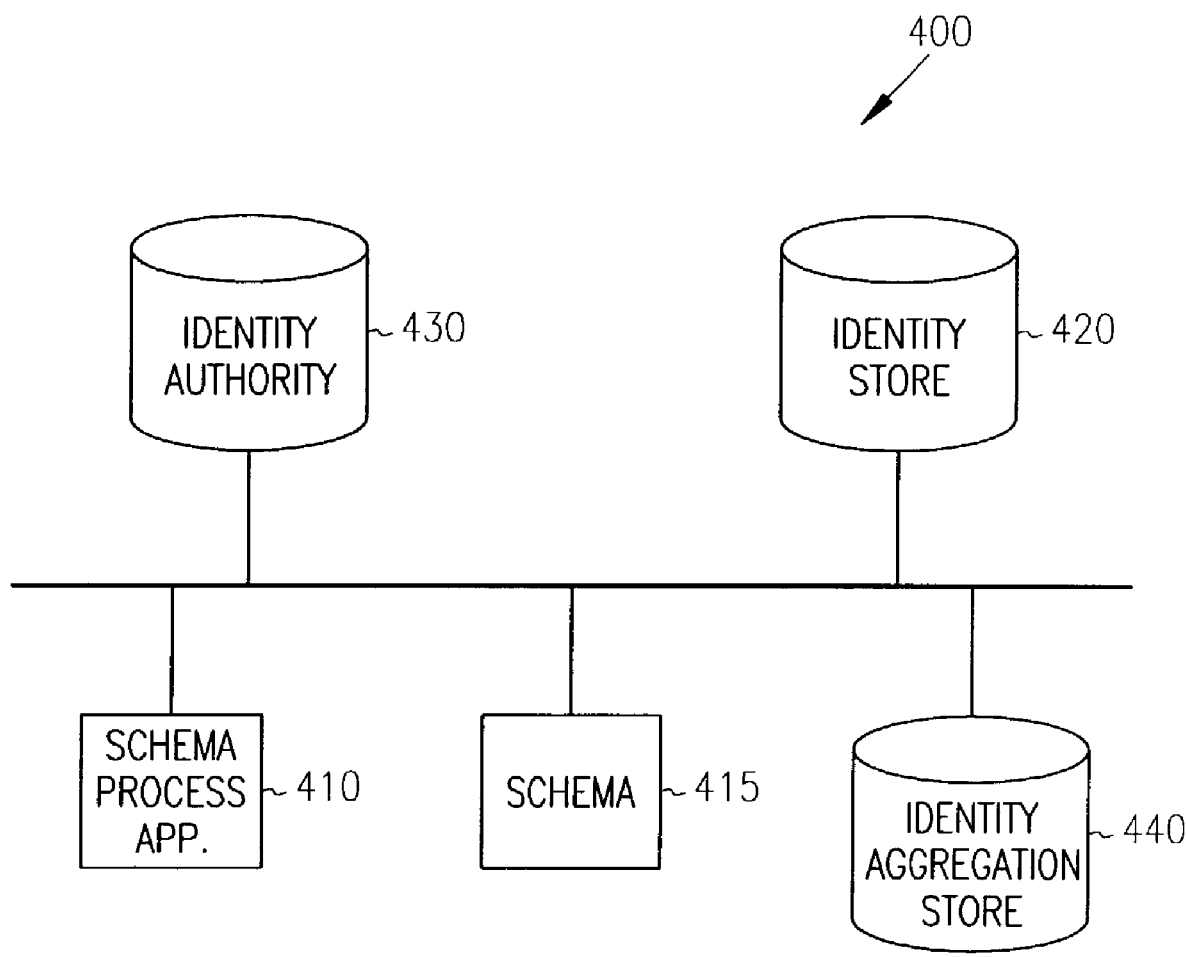
FIG. 4 is a diagram of an identity aggregation system, according to one embodiment of the invention.

FIG. 4 is a diagram of an identity aggregation system 400, according to one embodiment of the invention. The identity aggregation system 400 resides and operates within a computer accessible medium, such as a network having storage devices and processing resources. The identity aggregation system 400 includes an aggregation schema 415, an identity store 420, an identity authority 430, and an identity aggregation store 440.

The aggregation schema 415 is used to define and populate records of the identity aggregation store 440 by defining access to the identity authority 430 and to the identity store 420. A schema processing application or parser 410 uses the aggregation schema 415 to drive processing in order to populate the records of the identity aggregation store 440. Each populated record represents a new aggregated identity data structure.

In some embodiments, the aggregation schema 415 defines primary keys for the records of the identity aggregation store 440. Each primary key identifies a specific one of the aggregate identities (e.g., records of the identity aggregation store 440). The primary keys can include one or more of the identifications included from the identity authority 430. In other instances, the primary keys can be independent of the identifications and uniquely generated from the identity aggregation store 440 or the schema processing application 410.

Furthermore, in one embodiment, the records of the identity aggregation data store 440 are automatically or periodically updated to reflect changes occurring to identifications or attributes in the identity authority 430 or the identity store 420.

The records representing the aggregated identities can be associated with any electronic resources or data structures. In one embodiment, at least one record in the identity aggregation store 440 is an aggregated identity, containing a set of decisions that were processed by a policy system. The set is canonical, in that each decision is ordered according to priority or importance. This ordering can be based on priorities associated with a policy. In another embodiment, at least one record in the identity aggregation store 440 is an aggregated identity comprising a global policy constructed by joining one or more subsidiary or related policies represented by identifiers in the identity authority 430. The subsidiary or related policies are linked via definitions of the aggregated schema 415.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method implemented in a computer-readable medium to aggregate an identity and executed on a computer, the method comprising:
   accessing, by the computer, one or more identity authorities and one or more identity stores with a single schema to acquire multiple identifiers and attributes associated with the aggregated identity, the multiple identifiers are information used to represent a single and same electronic resource identified as the aggregated identity, each of the multiple identifiers assigned to a single and same unique identity for the electronic resource and the multiple identifiers for the single and same unique identity are included in the single schema, and the identity authorities are applications that process on the computer, the identity authorities create, manage, control, and distribute the aggregated identity and other aggregated identities; and
   assembling, by the computer, the acquired identifiers and attributes to aggregate into the aggregated identity.

2. The method of claim 1 wherein the single electronic resource identified by the aggregated identity is associated with at least one of an application, a resource, an entity, a policy, a decision set, and a user.

3. The method of claim 1 wherein the schema identifies the one or more identity authorities and one or more identity stores and includes logic processed by the computer for assembling the acquired identifiers and the attributes to aggregate the identity.

4. The method of claim 1 wherein the schema is represented as rules in a defined data format.

5. The method of claim 1 wherein the one or more identity authorities store at least one of the identifiers assembled to aggregate the identity.

6. The method of claim 1 wherein the one or more identity stores store at least one of the attributes associated with at least one of the identifiers assembled to aggregate the identity.

7. The method of claim 1 wherein the assembling is automatically performed when changes are detected in one or more of the identity authorities or one or more of the identity stores.

8. The method of claim 1, further comprising storing, by the computer, the identifiers and the attributes in an identity aggregation data store for subsequent access.

9. An identity aggregation data store implemented in a computer-readable medium, residing in a computer-accessible medium and executed on a computer, the identity aggregation data store comprising:
   primary keys associated with first identifications acquired, on the computer, from at least one of one or more external sources;
   secondary keys associated with second identifications acquired, on the computer, from at least one of one or more of the external sources; and
   attributes associated with the primary and the secondary keys and acquired, on the computer, from at least one of the one or more external sources;
   wherein the primary keys, the secondary keys, and the attributes are assembled, on the computer, in fields according to a single aggregate schema that defines aggregate identity records in the identity aggregation data store via the computer, the identity aggregation data store provides access, via the computer, to the aggregated identity records to consuming applications, and wherein each identity aggregation record includes a particular first identification and a particular second identification for a particular identity, each identity aggregation record representing, on the computer, an aggregation of multiple identifiers for a single electronic resource that identifies the particular identity to which it relates, the single aggregate schema includes the particular first and second identifications for the same particular identity.

10. The identity aggregation data store of claim 9, wherein the one or more external sources include identity authorities and identity sources.

11. The identity aggregation data store of claim 10, wherein the identity authorities control or distribute, on the computer, one or more of the first and the second identifications.

12. The identity aggregation data store of claim 9, wherein the aggregate schema is automatically activated and used, via the computer, to populate the aggregate identity records when changes are detected in the one or more external sources.

13. The identity aggregation data store of claim 9, wherein the aggregate schema is periodically activated and used, via the computer, to populate the aggregate identity records at configured periods.

14. The identity aggregation data store of claim 9, wherein the attributes are represented, on the computer, as links to external source attribute data residing on at least one of the one or more external sources.

15. The identity aggregation data store of claim 9, wherein the identity aggregation data store is at least one of a data warehouse, a database, a directory, and an electronic file.

16. An identity aggregation system implemented in a computer-readable medium and executed on a computer, comprising:
   a single aggregation schema embodied in a computer-readable medium and processed by the computer;
   an identity store embodied in a computer-readable medium and processed by the computer;
   an identity authority embodied in a computer-readable medium and processed by the computer; and
   an identity aggregation store embodied in a computer-readable medium and processed by the computer;
   wherein the single aggregation schema is for defining and formatting records of the identity aggregation store by defining access to the identity authority and to the identity store needed to generate aggregate identities that are stored in the identity aggregation store, and each aggregated identity within the identity aggregation store includes multiple identifiers for a single electronic resource representing a unique identity and those multiple identifiers are to be consumed to identify the unique identity for the single electronic resource, the single aggregation schema includes the multiple identifiers for the same unique identity.

17. The identity aggregation system of claim 16, wherein the aggregation schema is for defining primary keys for the records of the identity aggregation store, via the computer, each primary key uniquely identifying a specific one of the aggregate identities.

18. The identity aggregation system of claim 16, wherein the identity aggregation store is capable of being automatically or periodically updated, via the computer, to reflect changes in the identity authority and identity store.

19. The identity aggregation system of claim 16, wherein at least one of the aggregate identities is a canonical set of decisions that are generated from enforcing a policy on the computer.

20. The identity aggregation system of claim 19, wherein the canonical set of decisions is ordered according to a desired priority of the policy via the computer.

21. The identity aggregation system of claim 16, wherein at least one of the aggregate identities is a global policy that includes a plurality of sub-policies.

* * * * *

UNITED STATES PATENT AND TRADEMARK OFFICE
CERTIFICATE OF CORRECTION

| | | |
|---|---|---|
| PATENT NO. | : 7,571,172 B2 | Page 1 of 1 |
| APPLICATION NO. | : 10/430542 | |
| DATED | : August 4, 2009 | |
| INVENTOR(S) | : Scott Alan Isaacson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 599 days.

Signed and Sealed this
First Day of February, 2011

David J. Kappos
*Director of the United States Patent and Trademark Office*